United States Patent Office 3,294,844
Patented Dec. 27, 1966

3,294,844
PRODUCTION OF AXEROPHTHYL
PHOSPHONIUM SALTS
Wilhelm Sarnecki, Axel Nuerrenbach, and Werner Reie, Ludwigshafen (Rhine), Germany, assignors to Badische Anilin- & Soda-Fabrik Aktiengesellschaft, Ludwigshafen (Rhine), Germany
No Drawing. Filed May 20, 1963, Ser. No. 281,790
Claims priority, application Germany, May 23, 1962, B 67,363
7 Claims. (Cl. 260—606.5)

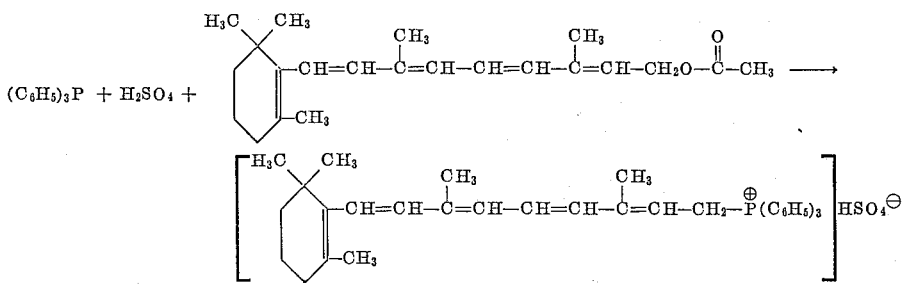

This invention relates to a new process for the production of axerophthyl phosphonium salts in which the axerophthyl radical (I):

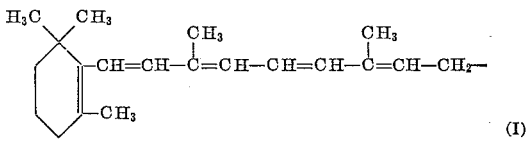

is one of the four ligands of phosphorus.

Axerophthyl phosphonium salts are valuable intermediates for syntheses in the vitamin A series.

It is the object of this invention to prepare these compounds in a particularly expedient and the most economical way possible.

We have found that quaternary axerophthyl phosphonium salts are obtained in excellent yields by quaternizing tertiary phosphines with esters of axerophthyl (vitamin A alcohol), i.e., by reacting esters of axerophthol (vitamin A alcohol) with tertiary phosphines and acids or with the hydrosalts of tertiary phosphines.

Not only are the esters of all-trans-vitamin A alcohol suitable for the process according to this invention but also esters of cis-vitamin A alcohol, particularly esters of low molecular weight fatty acids, such as acetic acid and propionic acid.

Tertiary phosphines having aromatic radicals, for example triarylphosphines, such as tri-p-tolylphosphine, trianisylphosphine and particularly triphenylphosphine, are suitable.

Suitable acids are inorganic and organic acids which will form salts with the tertiary phosphines, as for example organic sulfonic acids, such as benzenesulfonic acids and toluenesulfonic acids, and particularly sulfuric acid. Suitable hydrosalts of the tertiary phosphines are the tertiary phosphonium salts of the said acids, for example triphenyl phosphonium sulfate.

The reaction is advantageously carried out in solvents, for example in benzene, toluene, diethyl ether, tetrahydrofuran, alcohols and acid derivatives, such as acetonitrile and acetic esters. Polar solvents, such as alcohols and acetonitrile, are preferred. When the solvent is correctly chosen, the quaternary phosphonium salt crystallizes out in many cases and can then be filtered off direct.

The reaction temperature may vary within wide limits, for example from $-20°$ to $+120°$ C. In the upward direction it is mainly limited by the temperature at which the vitamin A ester begins to decompose. It is advantageous to work at temperatures between $0°$ and $80°$ C., depending on the type of solvent and of vitamin A ester. The reaction period depends on a number of factors, including the reaction temperature. For example some days are required for the reaction between vitamin A acetate, triphenylphosphine and sulfuric acid at temperatures of about $-10°$ C., but only a few minutes at $+80°$ C.

The reaction according to this invention, in which equimolar amounts of the reactants react with each other, proceeds, for example in the case of the last-mentioned reaction above, according to the following equation:

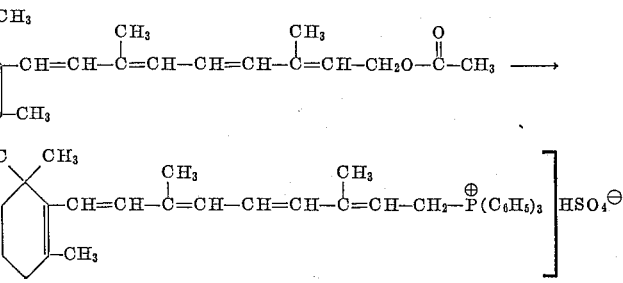

The process according to this invention represents a considerable advance in the art because it is now possible to prepare in pure form the quaternary axerophthyl phosphonium salts which are valuable intermediates for syntheses of carotene and other carotenoids, direct from esters of axerophthol (vitamin A alcohol). This is of great advantage because in commercial processes axerophthol is usually obtained in the form of its esters which are more readily accessible and more stable than the alcohol. Moreover vitamin A is often present in nature in the ester form. Since in all industrial vitamin A syntheses, the ester is prepared as the end product, waste liquors which contain the ester are always obtained and it is troublesome to isolate the ester from them. Such waste liquors may now be worked up direct to axerophthyl phosphonium salts.

The fact that axerophthol esters can be converted direct and without difficulty into the quaternary phosphonium salts is astonishing because according to U.S. patent specification No. 2,905,717, which describes the production of quaternary phosphonium salts from phosphonium hydrohalides and alcohols, ester groups do not take any part in this reaction.

The invention is further illustrated by the following examples in which, unless otherwise stated, parts are by weight. Parts by weight bear the same relation to parts by volume as the kilogram to the liter.

Example 1

A mixture of 36 parts of triphenyl phosphonium hydrogen sulfate, 33 parts of all-trans-vitamin A acetate and 250 parts by volume of methanol is stirred at room temperature for several hours. The solvent is then distilled off under subatmospheric pressure at a bath temperature of $40°$ C., and the distillation residue dissolved in 100 parts by volume of acetonitrile and stirred for three hours at $-10°$ C. The crystalline precipitate is filtered off and dried. 54 parts of axerophthyltriphenyl phosphonium hydrogen sulfate is obtained (melting point: $194°$ to $196°$ C.; phosphorus content: 4.8%; E (1%, 1 cm., 339 millimicrons) =705).

Example 2

36 parts of an industrial waste oil containing up to about 30% of cis- and trans-vitamin A acetate is stirred with 27 parts of triphenyl phosphonium hydrogen sulfate in 250 parts by volume of ethyl acetate for fifteen hours at room temperature and then for another three hours in an ice-bath. The precipitate is filtered off, washed with cold ethyl acetate and dried.

26 parts of axerophthyltriphenyl phosphonium hydrogen sulfate is obtained (E (1%, 1 cm., 338 millimicrons)=590).

Example 3

A mixture of 26.5 parts of triphenylphosphine, 21 parts of 90% p-toluenesulfonic acid, 33 parts of vitamin A acetate and 100 parts by volume of methanol is stirred for fifteen hours at room temperature and another two hours at 40° C. The solvent is then evaporated in a water jet vacuum at a bath temperature at 40° C. The residue is digested four times, each time in 100 parts by volume of absolute ether. After the ether has been decanted off, the residual viscous oil is freed from other residues in vacuo. 63 parts of axerophthyltriphenyl phosphonium p-toluenesulfonate is obtained (E (1%, 1 cm., 337 millimicrons)=640).

Example 4

A mixture of 36 parts of triphenyl phosphonium hydrogen sulfate, 33 parts of vitamin A acetate and 150 parts of anhydrous benzene is boiled for five minutes. It is then cooled to 5° to 10° C. and stirred for another seven hours. The crystal mash is filtered off and dried. 34 parts of crude axerophthyltriphenyl phosphonium hydrogen sulfate is obtained (melting point 177° C.; E (1%, 1 cm., 339 millimicrons)=620).

Example 5

A mixture of 36 parts of triphenyl phosphonium hydrogen sulfate, 53 parts of a 94% concentrate of vitamin A palmitate and 150 parts of methanol is stirred for two hours at 40° C. After a few hours more, the solvent is evaporated in a water jet vacuum at a bath temperature of 40° C. The residue is digested twice, each time with 100 parts by volume of absolute ether.

The ether is decanted off, 150 parts by volume of acetonitrile added to the residue and the whole stirred for one hour at 0° C. The precipitate is filtered off and dried. 45 parts of axerophthyltriphenyl phosphonium hydrogen sulfate which still contains some palmitic acid is obtained (melting point 169° C.; E (1 cm., 1%, 338 millimicrons)=654).

Example 6

32.8 parts of crystalline vitamin A acetate is added at room temperature to a mixture of 26.5 parts of triphenylphosphine and 18.4 parts of a 47.8% ethereal fluoboric acid in 100 parts by volume of ethyl acetate.

After the whole has been stirred for twenty-four hours, the axerophthyltriphenyl phosphonium fluoborate is precipitated with n-octane. 68 parts of the said salt is obtained (E (1%, 1 cm., 338 millimicrons)=496).

We claim:
1. A process for the production of quaternary axerophthyl phosphonium salts which comprises: reacting an ester of axerophthol with a member selected from the group consisting of a tertiary phosphine and a hydrosalt of a tertiary phosphine, with the proviso that where a tertiary phosphine is used as the reactant, an acid which will form with the tertiary phosphine a hydrosalt is present in the reaction mixture.

2. A process as in claim 1 wherein the tertiary phosphine is triaryl phosphine.

3. A process as in claim 1 wherein the reaction is carried out at a temperature between 0 and 80° C.

4. A process as in claim 1 wherein the reaction is carried out in the presence of an inert organic solvent.

5. A process as in claim 1 wherein an ester of cis-axerophthol is used as an initial reactant.

6. A process as in claim 1 wherein a waste liquor containing an ester of axerophthol, which liquor has been obtained in the production and purification of said ester, is used as an initial reactant.

7. A process as in claim 1 wherein an acid selected from the group consisting of sulfuric acid, fluoboric acid, benzene sulfonic acid, and toluene sulfonic acid is used as the acid which will form hydrosalts with said tertiary phosphine.

No references cited.

TOBIAS E. LEVOW, *Primary Examiner.*

W. F. W. BELLAMY, *Assistant Examiner.*

UNITED STATES PATENT OFFICE
CERTIFICATE OF CORRECTION

Patent No. 3,294,844                                December 27, 1966

Wilhelm Sarnecki et al.

It is hereby certified that error appears in the above numbered patent requiring correction and that the said Letters Patent should read as corrected below.

In the heading to the printed specification, line 4, for "Werner Reie" read -- Werner Reif --.

Signed and sealed this 5th day of November 1968.

(SEAL)
Attest:

Edward M. Fletcher, Jr.                                EDWARD J. BRENNER
Attesting Officer                                       Commissioner of Patents

Notice of Adverse Decision in Interference

In Interference No. 96,313 involving Patent No. 3,294,844, W. Sarnecki, A. Nuerrenbach and W. Reif, PRODUCTION OF AXEROPHTHYL PHOSPHONIUM SALTS, final judgment adverse to the patentees was rendered Sept. 22, 1969, as to claims 1, 2, 3, 4, and 7.
[*Official Gazette March 17, 1970.*]